(12) United States Patent
Bigus (10) Patent No.: US 11,123,901 B2
(45) Date of Patent: Sep. 21, 2021

(54) DEVICE AND METHOD FOR THE CREATION OF 2D AND 3D OBJECTS BY USING A 3D DRAWING PEN

(71) Applicant: Kazimierz Bigus, Woodside, NY (US)

(72) Inventor: Kazimierz Bigus, Woodside, NY (US)

( * ) Notice: Subject to any disclaimer, the term of this patent is extended or adjusted under 35 U.S.C. 154(b) by 800 days.

(21) Appl. No.: 15/857,500

(22) Filed: Dec. 28, 2017

(65) Prior Publication Data

US 2018/0186038 A1 Jul. 5, 2018

Related U.S. Application Data

(60) Provisional application No. 62/610,630, filed on Dec. 27, 2017, provisional application No. 62/440,364, filed on Dec. 29, 2016.

(51) Int. Cl.
| | |
|---|---|
| *B29C 33/42* | (2006.01) |
| *B29C 64/245* | (2017.01) |
| *B29C 64/118* | (2017.01) |
| *B29C 48/02* | (2019.01) |
| *B29C 48/05* | (2019.01) |
| *B29C 33/00* | (2006.01) |
| *B33Y 40/00* | (2020.01) |

(52) U.S. Cl.
CPC ............ *B29C 33/424* (2013.01); *B29C 48/02* (2019.02); *B29C 48/05* (2019.02); *B29C 64/118* (2017.08); *B29C 64/245* (2017.08); *B29C 2033/0005* (2013.01); *B33Y 40/00* (2014.12)

(58) Field of Classification Search
CPC ....... B29C 48/02; B29C 48/05; B29C 64/245; B29C 64/118; B29C 33/42
See application file for complete search history.

(56) References Cited

PUBLICATIONS

Teach Crunch Article, Hands on With the 3Doodler Start, A39 Kid-Friendly 3D-Printing Pen, Feb. 12, 2016 (Year: 2016).*
Make Anything, Making Art with the 3Doodler Start, Oct. 29, 2016, https://www.youtube.com/watch?v=zge0qRdC35Y (Year: 2016).*
Editor Sophie Charara, 3Doodler 3D printing pen gets nozzles, DoodleBlock moulds and accessories at CES, Jan. 7, 2014, https://www.stuff.tv/news/3doodler-3d-printing-pen-gets-nozzles-doodleblock-moulds-and-accessories-ces, 5 pages.†

(Continued)

*Primary Examiner* — Nahida Sultana
*Assistant Examiner* — Mohamed K Ahmed Ali
(74) *Attorney, Agent, or Firm* — Muncy, Geissler, Olds & Lowe, P.C.

(57) ABSTRACT

The object of the present invention consists of a device that allows for the easy creation of 2-dimantional and 3-dimensional plastic objects using a 3-D drawing pen. The device object of the present invention is comprised of a flexible, heat resistant, non-sticky, transparent silicon mat characterized by the presence of grooves cut in its surface, the path of which can be of any geometric or non-geometric shape. The groove works as a guide for the 3-D drawing pen user by allowing such user to stretch the melted plastic, extruded by the 3D pen, on its bed, and within its walls, so that once hard the plastic object is exactly of the shape of the groove and its path, and not an imprecise shape caused by the unstableness of the hand of the free-hand 3-D pen user.

6 Claims, 9 Drawing Sheets

(56) References Cited

PUBLICATIONS

Editor Lucas Matney, Hands on With the 3Doodler Start, a $39 Kid-Friendly 3D-Printing Pen, Feb. 12, 2016, TechCrunch, https://techcrunch.com/2016/02/11/hands-on-with-the-3doodler-start-a-39-kid-friendly-3d-printing-pen, 6 pages.†

Youtube channel 3Doodler Start, 3Doodler Start DoodleBlock Bracelet Project Demo, Mar. 1, 2016, Youtube.com, https://www.youtube.com/watch?v=69ijjReMOlk, 3 pages.†

3Doodler, Stencils for Practice GIF, Jun. 8, 2016, https://gfycat.com/mintyserenedipper-3doodler, 1 page.†

\* cited by examiner
† cited by third party

DEVICE AND METHOD FOR THE CREATION OF 2D AND 3D OBJECTS BY USING A 3D DRAWING PEN

CROSS-REFERENCES TO RELATED APPLICATIONS

The present patent application claims the benefit of a U.S. provisional patent application No. 62/440,364 filed on 29 Dec. 2016 and a U.S. provisional patent application No. 62/610,630 filed on 27 Dec. 2017, the disclosures of which are incorporated herein in their entirety by reference.

FIELD OF THE INVENTION

The field of the present invention is the 3D printing and 3D drawing field by use of a 3D pen. The invention at issue aims to a device which allows for the creation of 2-D, and 3D plastic objects, structures, or shapes using an ABS, or similar filament, extruded by a 3D drawing pen. Namely, this invention teaches how to create various plastic objects using a silicon mat characterized by grooves cut in the top surface of the mat, the line/track of which can be of all shapes (straight, circular, curvy, oval, squared, triangular, or of other geometric or non-geometric shapes)—that can be also compatible for shape and sizes to allow an easy connection of the edges of the objects created for the building of more complex 2-dimensional, and 3-dimensional objects—in which the melted plastic filament, extruded by the 3 D pen, is laid by the drawer.

BACKGROUND OF THE INVENTION

This invention relates to the field of 3-dimensional printing, and namely 3-dimensional drawing through 3D pens extruding heated plastic that cools almost instantly into a solid structure, allowing for the free-hand creation of three-dimensional objects or structural parts of the latter.

The creation of 3D printers, and the use of 3D printers, has led to the creation also of 3D free-hand pens. A free-hand 3D drawing pen utilizes plastic thread made of either acrylonitrile butadiene styrene ("ABS"), polylactic acid ("PLA"), or "FLEXY", thermal polyurethane ("TPU"), or similar materials, that is melted and then cooled through a process, while moving through the 3-D drawing pen, which can then be used to make 2-dimensional, and 3-dimensional objects by hand.

In today's use and application of 3D pens for drawing 2-dimensional, and 3-dimensional objects, it has been noted a problem. The proper creation of objects and structures in the air, by the only use of the free-hand 3D drawing pen and fingers often holding the initial extruded and cooled part of the filament extruded by the 3-D drawing pen, using a simple table top, or design patterns printed on paper to be followed by the point of the 3-D pen, is very cumbersome and causes often the intended object not to be drawn properly, and not to be suitable to be the coveted final 3-dimensional object or 2-dimensional structural part of it. Often, in the act of using only a free-hand 3D drawing pen for the creation of 2-dimensional, and 3-dimensional plastic objects in the air, or only a table top or design patterns printed on paper, the drawing of plastic parts/objects, which have to be of some sort of geometric or non-geometric precise shape, is troubled, and imprecisely performed, because of the free human hand unstableness and imprecision. This problem is aggravated by the fact that the extruded filament is, immediately after being extruded by the 3-D pen, still warm, soft, and subject, a fortiori, to acquire not the coveted shape, before it transforms into hard plastic. Therefore, the rendering of geometrical or non-geometrical plastic shapes, using a free-hand 3-D drawing pen only, is not precise and causes the coveted structure or object not to come to life in the desired shape and form.

Therefore, the necessity to create a device that could offer a solution to this problem by providing a guide to the 3D drawing pen user, the guide being a groove, cut in a certain manner in the surface of a silicon mat, the line/track of which can assume various geometric or non-geometric shapes, as well as shapes compatible with each other for building 3-dimensional objects, in which can be stretched the melted filament which will be shaped, therefore, once cooled, and become solid plastic, exactly as the line/track and shape of the groove.

PURPOSE AND SUMMARY OF THE INVENTION

The object of the present invention is a device that allows for the creation of 2-dimensional and 3-dimensional plastic (or similar material) objects using a 3-D drawing pen. The device object of the present invention consists of a silicon, non-sticky, heat-resistant, flexible, and transparent mat in the surface of which are cut grooves within which a still-soft plastic filament, extruded by a hand-free 3-D drawing pen, is laid down for the creation of 2-dimensional and 3-dimensional plastic objects. The surface of the above-described silicon, non-sticky, heat-resistant, flexible, and transparent mat can be virtually of any geometric or non-geometric shape and size within which, and in which can be cut grooves of the size and shape identified in these specifications.

In the device object of this invention, the grooves, the line/track of which can be of any design—a straight line, a circular line, an oval line, a curvy line, or any other geometric or non-geometric shape (virtually any shape) line—function as a guide for the drawer and as a depository for the melted plastic extruded by the 3-D pen, to allow for a correct and precise formation of plastic objects, through the containment of the laid melted filament within the walls of the groove, and avoid imperfections that would be caused by a completely free-hand use of a 3-D drawing pen.

The object of the present invention solves the problem of the impossibility, due to human free hand instability, and consequent lack of precision in drawing, to draw correctly 2-dimensional, and 3-dimensional objects by means of a free-hand 3-D drawing pen only.

BRIEF DESCRIPTION OF DRAWINGS

FIG. 1: shows a plan view of the mat in its preferred embodiment where are viewable 6 sets of groove tracks: a first triangular set of groove tracks with a straight line groove crossing vertically the center of the five triangular path grooves—1, its tracks—11, 12, 13, 14, 15, and 16; a second concentric squares and diagonal set of groove tracks—2, its tracks—21, 22, 23, 24, 25, 26, and 27; a third circular set of tracks—3, its tracks—31, 32, 33, 34, 35, 36, 37, and 38; a fourth grid set of tracks—4, its tracks—41, 42, 43, 44, 45, 46, 47, 48, 49, 50, 51, 52, 53, 54, 55, 56, 57, 58, 59, and 60; a fifth "fuse-and-join" concentric squares and diagonal set of tracks—5, its tracks—62, 63, 64, 65, 66, 67, and 68; a sixth grid set of tracks—6, its tracks—69, 70, 71, 72, 73, 74, 75, 76, 77, 78, 79, 80, 81, 82, 83, 84, 84, 86, 87, and 88

DETAILED DESCRIPTION OF THE INVENTION

The object of the present invention is a device which allows for the drawing of 2-dimensional, and 3-dimensional objects by means of a free-hand 3-D drawing pen.

The present invention belongs to the field of 3-dimensional printing including the field of the 3-D drawing pens.

Figure 6:
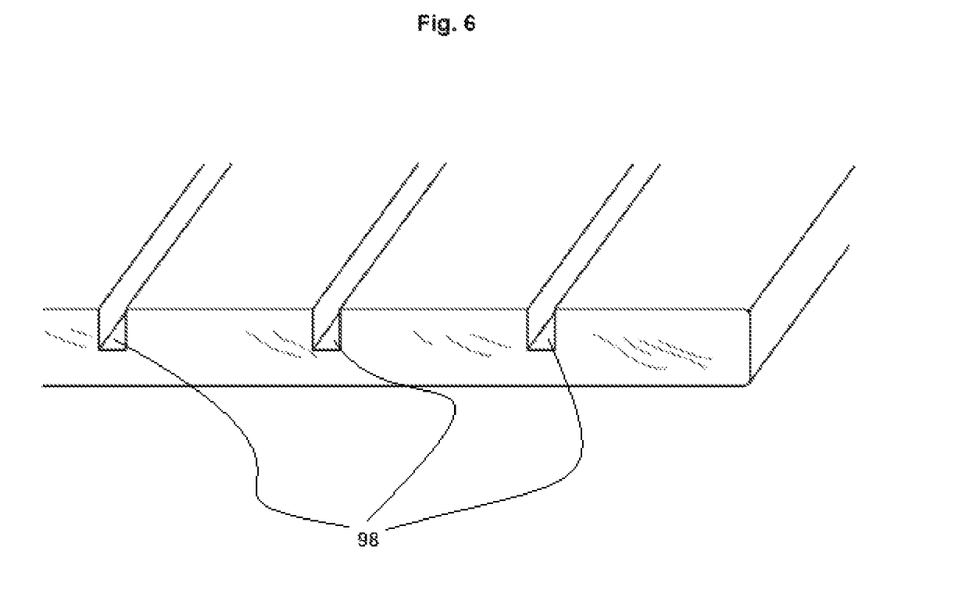
FIG. 6: shows a perspective partial view of a section of the of the mat and the grooves (98).
Figure 7:
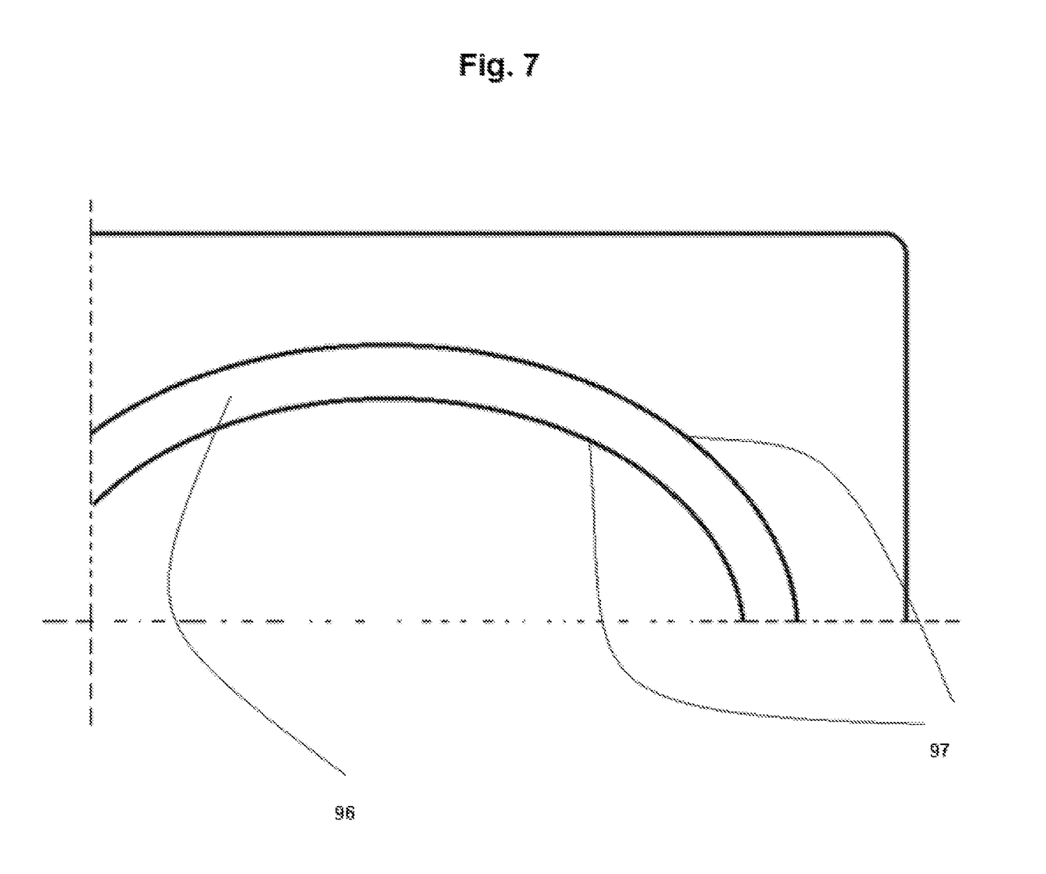
FIG. 7: shows a plan view of part of the mat when the groove line/track is a curve.
Figure 8:
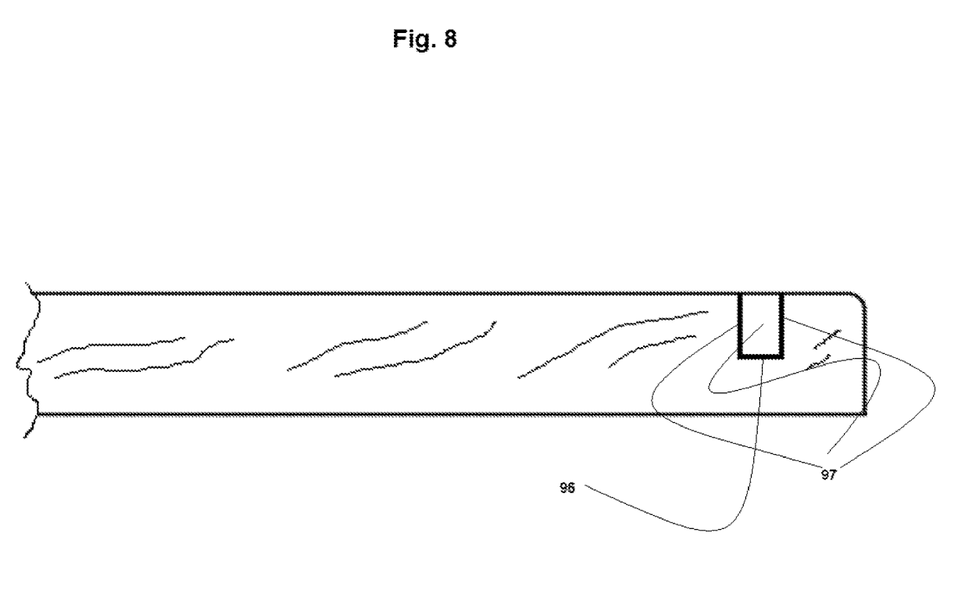
FIG. 8: shows an elevated view of a section of the mat when the line/track is a curve as shown in FIG. 7.

The object of the present invention consists in a non-sticky, heat resistant, transparent, flexible silicon mat characterized by grooves, cut in its top surface, which function as a guide for the drawer using a hand-free 3-D drawing pen (98). The surface of the above-described silicon, non-sticky, heat-resistant, transparent mat can be of virtually of any geometric or non-geometric shape and size.

Figure 9:
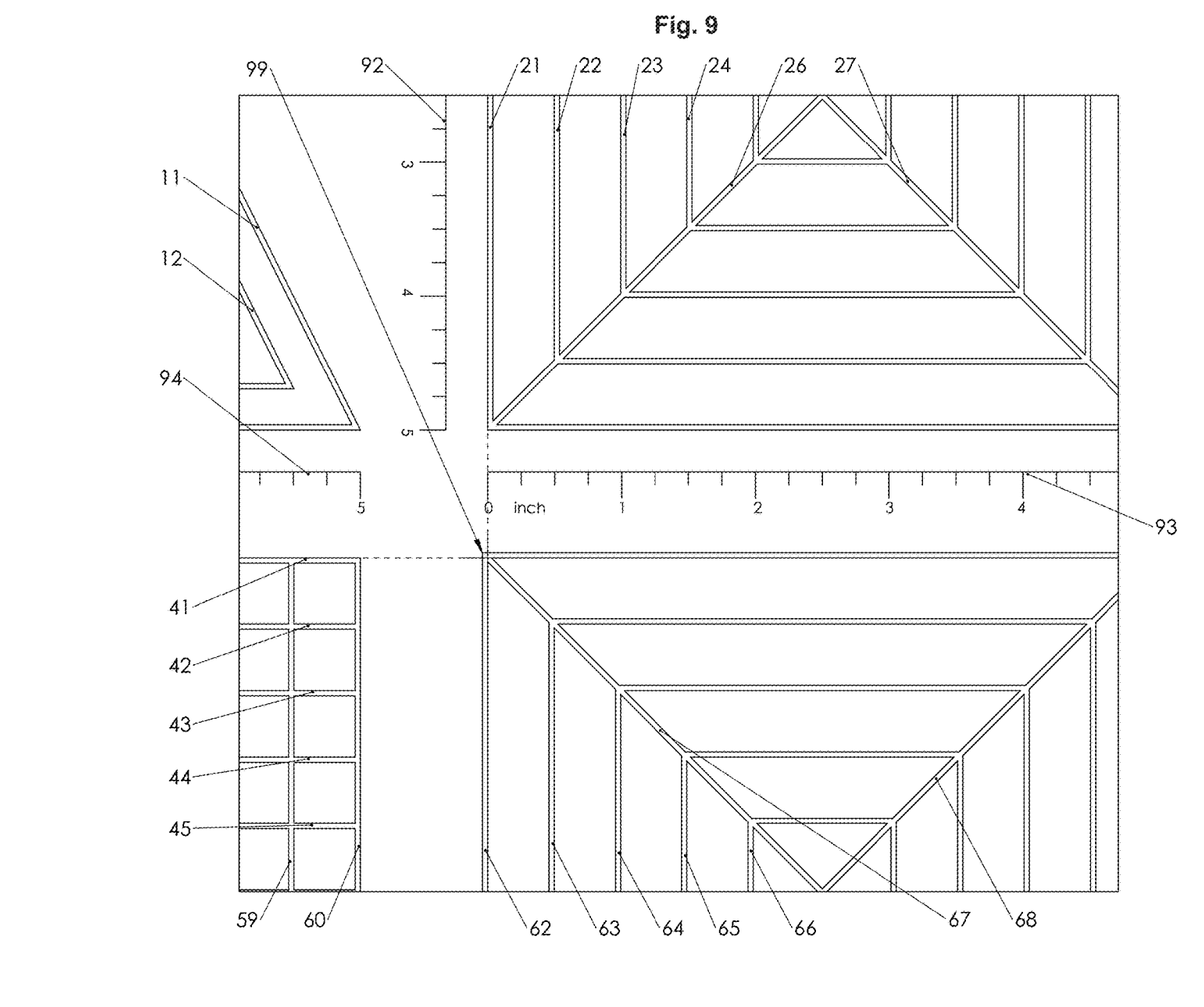
FIG. 9: shows a plan view close-up of the larger size of the length (99), end-to-end, of the groves of the "Fuse & Join" template compared to the groves of the same line/track shape of the other templates of the mat.

The thickness of the above-named, non-sticky, flexible silicon mat, in its preferred embodiment, is of 2.5 millimeters (99), and although it will lay in a stable manner, and provide its utility on a hard surface like a table, the flexible material chosen (silicon), and the flexibility of the mat itself, has the specific function of aiding the 3-D drawing pen user in the creation of plastic objects. In fact, when the melted plastic filament, stretched by the 3-D drawing pen user inside and along the grooves of the mat, has acquired the desired shape, and has become hard, such final product lays on the bed of the groove, and it can be cumbersome to extract it. The flexibility of the mat, therefore, allows the user to bend the mat, producing the effect of the natural expulsion of the plastic object created, and an easy extraction of it from inside the grooves. In other words, while the silicon, flexible mat is bent by the hands of the drawer, the straight, flat, hard plastic object naturally comes out of the grooves, ready to be picked.

The above-mentioned silicon mat, is made purposely of a non-sticky, heat resistant, transparent silicon matter. The plastic filament extruded by a 3-D drawing pen, being in a melted condition immediately after being extruded by the 3-D drawing pen, would stick to most materials. This latter phenomenon would not allow the 3-D pen user to extract the object drawn, and utilize the latter for the intended purpose, as the plastic object would remain attached to the mat not made of non-sticky, heat-resistant material. Therefore, the necessity to create and utilize a non-sticky, heat-resistant silicon mat as the basis for the 3-D drawing pen work. The non-stickiness allows the melted filament laid on the bed of the groove in a melted condition, not to attach to the mat, inside and along the groove, and it allows, therefore, and facilitates the easy extraction of the drawn plastic object from inside the grooves.

The above-mentioned silicon mat is transparent, allowing the users to draw plastic objects using paper stencils guides that are placed under the transparent mat and are viewable by the drawers. The transparency will allow the plastic object drawer to use printout stencils outlining certain template shapes, corresponding totally or partially to the shapes of the groove lines cut in the surface of the mat, and easily view, trace, and built the plastic shapes corresponding to those outlined in the printout stencils used.

Figure 1:
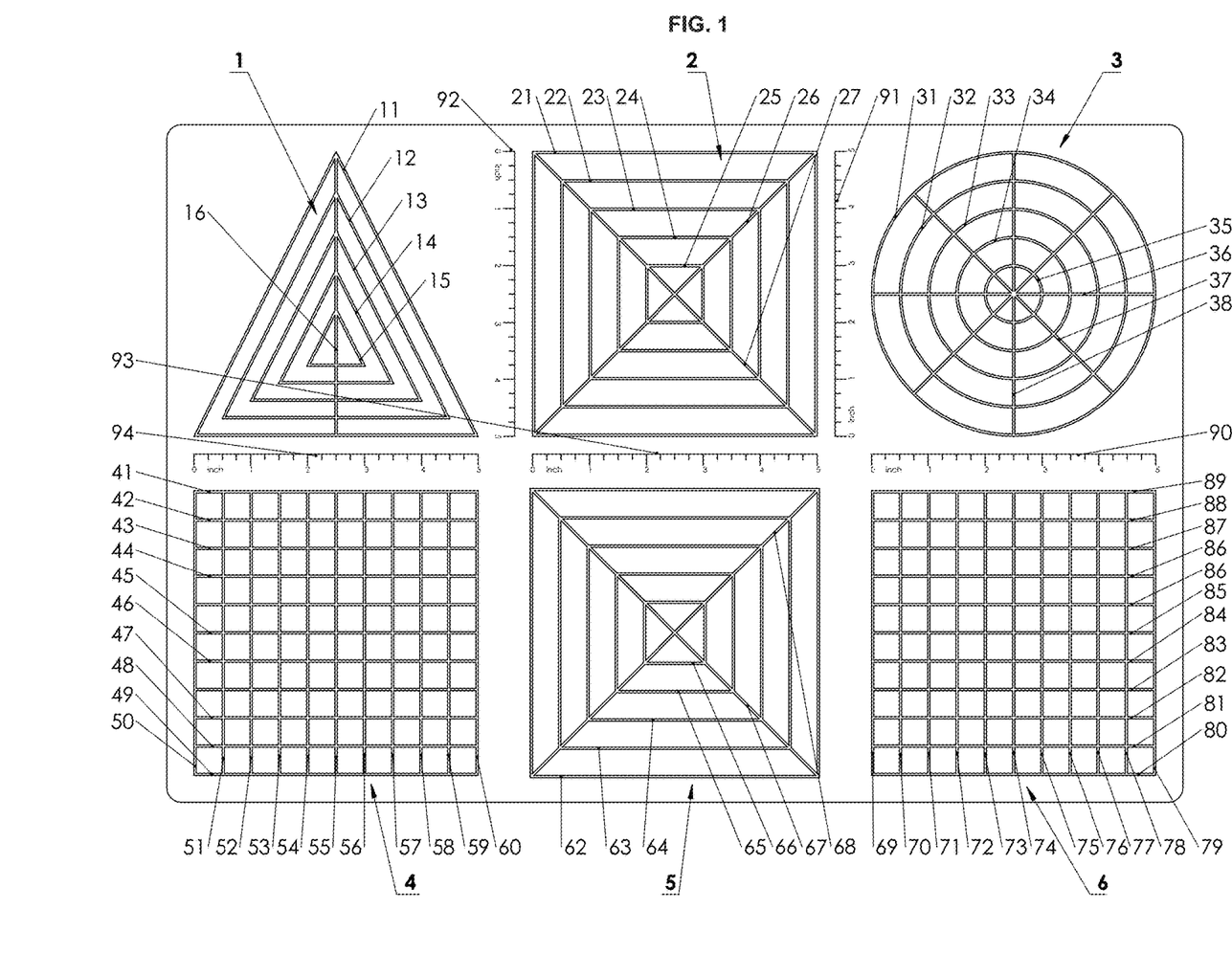
Figure 2:
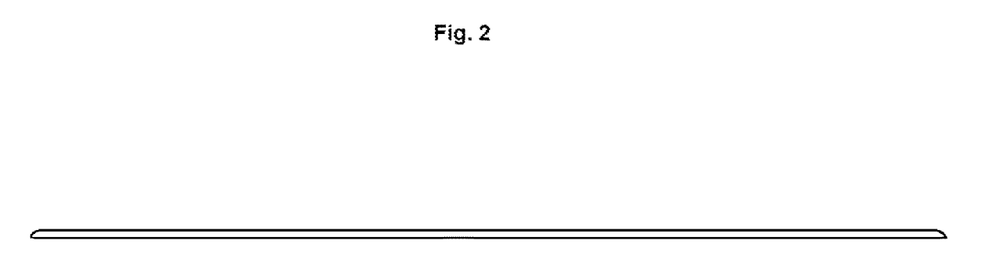
FIG. 2: shows an elevated view of the longer side of the mat in its preferred embodiment.
Figure 3:
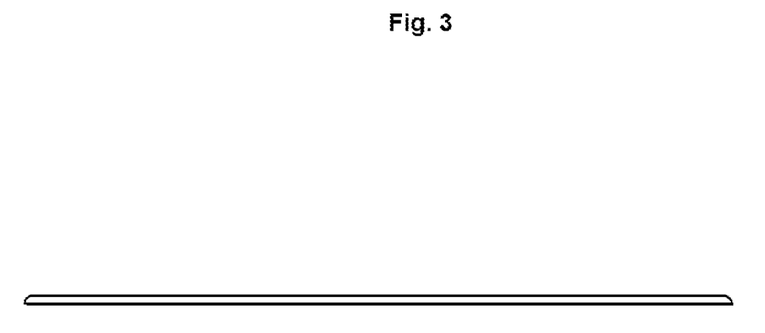
FIG. 3: shows an elevated view of the shorter side of the mat in its preferred embodiment.
Figure 4:
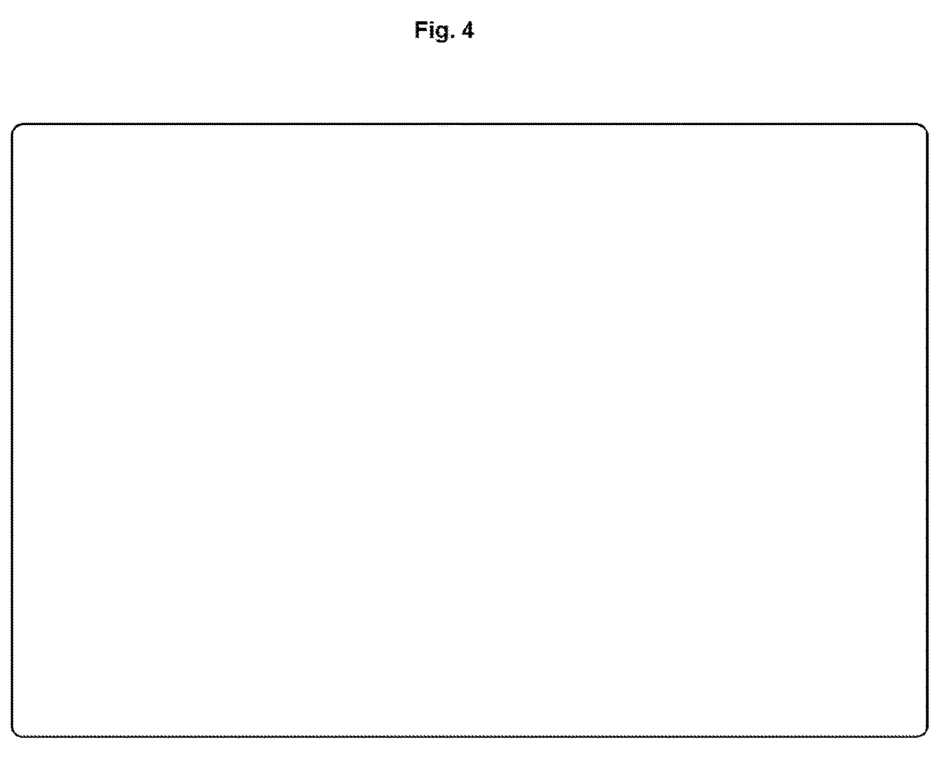
FIG. 4: shows a plan view of the bottom of the mat in its preferred embodiment.

The mat object of this invention, as identified above, is also characterized by the presence, in its preferred embodiment, on its surface, along the grooves, of a printed ruler (90, 91, 92, 93, and 94). Such ruler facilitates the measurement of the plastic parts while being created with the 3-D drawing pen, and the rendering of plastic objects of a certain measure. The presence of the ruler makes the device, object of the present invention, suitable to create more complex, precise, and measured plastic objects.

Figure 5:
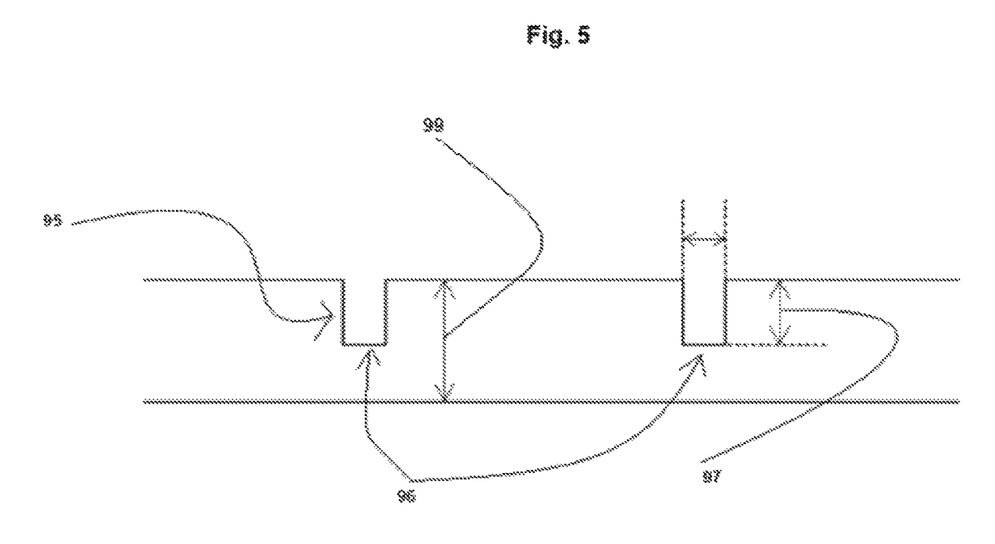
FIG. 5: shows an elevated view of a section of the mat and grooves, and has the aim of evidencing the type of the groove cut (square) in its preferred embodiment (95), and the sizes of the bed (96) and walls (97) of the groove.

The grooves cut in the surface of the mat are square groves (98). In a preferred embodiment of the invention, the bed of the square groove is 1 mm wide (96), and the walls of (or depth of) the square groove are 1.5 mm high (95). Nonetheless, the utility provided by this invention would not change if the sizes of the device object of this invention, namely the thickness of the mat, and the size of the square groove bed, and walls would change in accordance and proportion with the change of the size of the 3-D pen point and filament extruded. The utility of this invention would not change also if the cut of the groove consisted of straight walls, and a semi-oval, or semi-circular groove bed. Furthermore, as already stated above, the line (or path) of the groove, can be of virtually any geometric or non-geometric shape and size, and also the surface of the above-described silicon, flexible, non-sticky, heat-resistant, transparent mat can be virtually of any geometric or non-geometric shape and size.

PREFERRED EMBODIMENT OF THE INVENTION

The preferred embodiment of this invention is a non-sticky, transparent, heat resistant, silicon, and flexible mat with a thickness of 2.5 mm (99), characterized by square groves cut in its surface (98) with the bed of the square groove being 1 mm wide (96), and the walls of (or depth of) the square groove being 1.5 mm high (95).

In such preferred embodiment, in the surface of the mat, are cut sets of multiple grooves, of the sizes above described, the path of which is of various basic geometric shapes, of different sizes, namely, six sets of grooves disposed on the mat on two lines, three for each line (FIG. 1).

From the top left, on the first line, are cut the following sets of grooves: a set of five concentric triangular path grooves (1), with a straight line groove crossing vertically the center of the five triangular path grooves; a set of five concentric square path grooves, with two straight path/line grooves cut diagonally in reference to the corners of the set of the five square path grooves (2); a set of five concentric circular path grooves, with four straight path/line grooves dividing the set of five circular path grooves in equal parts (3).

From the bottom left, on the second line, are cut the following sets of grooves: a grid set of eleven horizontal straight line/track grooves, and eleven vertical straight line/ track grooves (4); a set of five concentric square line/track grooves with two straight path/line grooves cut in the mat diagonally in relation to the corners of such set of the five square path grooves (5).

This last described set of five square path grooves has the function to work as a "fuse & join" area for the plastic parts created with the other sets of grooves cut in the mat (1, 2, 3, 4, and 6).

The size of each side of the five square path grooves of the "fuse & join" area is, from end to end, 2 mm longer than all the other grooves cut in the mat and having the same geometric path/line (99).

The bed and walls of the grooves of the "fuse & join" area are the same size of all the other grooves, namely and respectively, 1 mm, and 1.5 mm.

The grooves of the "fuse & join" area have the function to help the creation of plastic parts that facilitate the proper joining of the plastic parts created with any other set of grooves templates cut in the mat.

Factually, once a plastic object is created with any set of grooves, other than the set of grooves of the "fuse & join" area, for the purpose of building one part of a more complex 3D plastic object, and it must, therefore, be properly joined to other parts by the use of the plastic filament extruded by the 3D drawing pen, it is necessary for some plastic matter to work as a base and surface for closely placing the parts that must be joined and for laying the melted filament so that, with the aid of such extruded melted plastic, working as a joiner, the parts will be tightened together, especially using the extra space on the corners of the parts built with the "fuse & join" area templates.

In other words, the length of the grooves of the "fuse & join" area are 1 mm×1 mm longer than the other grooves of the same shape (99). Therefore, when parts just 1 mm×1 mm smaller, built with the other set of grooves, are positioned over the correspondent 1 mm×1 mm larger parts built with the "fuse & join" area template (5), the 3D object builder, trying to join parts to build a complex plastic 3-dimensional object, can rely on an external edge, along the sides and corners, which can work as a basis for placing the parts to join upon, and to lay the extruded melted plastic for it to work as a joiner.

In this preferred embodiment, the mat is also characterized by the presence, on its surface, of printed rulers. Three of such rulers are printed horizontally in between the top sets of grooves, and the bottom sets of grooves (90, 93, and 94), each ruler in correspondence of one set of grooves, and two rulers are printed vertically on each side of the top second set of grooves (91, and 92).

I claim:

1. A device usable by a drawer for creation of 2-dimensional and 3-dimensional objects using a 3-D drawing pen; said device comprises a flexible mat including:
    a number of templates, each said template is characterized with a template surface including a plurality of template grooves of predetermined shapes and predetermined sizes; said template grooves each defines walls and a bed; said template grooves are capable of being filled in with a filament extruded by the 3-D drawing pen, such that the filament forms the 2-dimensional and 3-dimensional objects; said template grooves function as a guide for the drawer and as a depository for the filament thereby allowing for a correct and accurate formation of said 2-dimensional and 3-dimensional objects, through containing the filament laid within the walls of said template grooves; and
    a fuse-and-join area functioning as a base for concentrically placing the 2-dimensional and 3-dimensional objects formed within said number of templates as parts for assembling thereof into a complex 3-dimensional object, and joining said 2-dimensional and 3-dimensional objects by the filament extruded by the 3-D drawing pen; wherein said filament functions as a joiner for said parts; and wherein said fuse-and-join area is characterized by a plurality of fuse-and-join grooves having sizes exceeding the respective predetermined sizes of said template grooves by an extra length, the extra length is at least one size of predetermined sizes of said template grooves, and thereby producing an external edge of the base.

2. The device according to claim 1, wherein:
    said filament is made of soft plastic capable of melting in the 3-D drawing pen and hardening after ejecting therefrom;
    said mat is made of non-sticky, heat-resistant, and transparent material;
    said device further comprising paper stencils guides placed under the mat;
    said paper stencils guides are made viewable by the drawer thereby allowing of drawing said 2-dimensional and 3-dimensional objects; wherein said printout stencils outline certain template shapes, corresponding totally or partially to the predetermined shapes of said template grooves; and wherein said extra length is 2 mm.

3. The device according to claim 2, wherein: said template grooves are made with a rectangular cross-section, wherein the bed of each said rectangular cross-section groove defines a bed width of said bed, and the walls of each said rectangular cross-section groove define a walls height of said walls, and wherein a proportion of the bed width and the walls height is 2:3.

4. The device according to claim 3, wherein: said bed width is 1 mm, and said walls height is 1.5 mm.

5. The device according to claim 2, wherein: said device further comprising a printed ruler facilitating measurement of said parts being formed with the 3-D drawing pen, rendering the 2-dimensional and 3-dimensional objects of a certain measure, and providing for formation of more complex, precise, and scalable objects.

6. The device according to claim 1, wherein: said number of templates includes five templates defining the predetermined shapes of said template grooves, wherein:
    a first template defines a set of five concentric triangular path grooves with a straight line groove crossing vertically a center of the five triangular path grooves;
    a second template defines a set of five concentric square path grooves, with corners and two straight path grooves cut diagonally in reference to the corners;
    a third template defines a set of five concentric circular path grooves with four straight path grooves dividing the set of five circular path grooves in equal parts;
    a fourth template defines a grid set of eleven horizontal straight path grooves, and eleven vertical straight path grooves; and a fifth template defines a set of five concentric square path grooves with corners and with two straight path grooves cut in the mat diagonally in relation to the corners of said set of five square path grooves.

* * * * *